United States Patent
Welker et al.

(10) Patent No.: US 8,413,499 B2
(45) Date of Patent: Apr. 9, 2013

(54) PARTIAL STROKE TESTING

(75) Inventors: Patrick Welker, Muncie, IN (US);
Brian Zabel, Yorktown, IN (US);
Gregory Todd Filkovski, Muncie, IN (US)

(73) Assignee: Honeywell International Inc., Morristown, NJ (US)

( * ) Notice: Subject to any disclaimer, the term of this patent is extended or adjusted under 35 U.S.C. 154(b) by 91 days.

(21) Appl. No.: 13/198,796

(22) Filed: Aug. 5, 2011

(65) Prior Publication Data
US 2011/0284106 A1    Nov. 24, 2011

Related U.S. Application Data

(63) Continuation-in-part of application No. 12/235,377, filed on Sep. 22, 2008, now Pat. No. 8,056,390.

(51) Int. Cl.
*G01N 7/20* (2006.01)
(52) U.S. Cl. .......................................................... 73/168
(58) Field of Classification Search .................. None
See application file for complete search history.

(56) References Cited

U.S. PATENT DOCUMENTS

| 5,030,939 | A  | 7/1991  | Lovick |
| 6,789,563 | B2 | 9/2004  | Filkovski et al. |
| 6,805,328 | B2 | 10/2004 | Filkovski et al. |
| 2002/0145515 | A1 | 10/2002 | Snowbarger et al. |

OTHER PUBLICATIONS

Holtgraver; Emergency Shutdown Valves: Options for Partial Stroke Testing; Valve Magazine; pp. 28-33; Summer 2008.
Anonymous; Mechanical Limit Switches; Engineers Edge website at http://www.engineersedge.com/instrumentation/limit_switches.htm; 2001-2008.

*Primary Examiner* — Robert R Raevis
(74) *Attorney, Agent, or Firm* — Barnes & Thornburg LLP

(57) ABSTRACT

Partial Stroke Testing (PST) equipment and methodologies provide PST data for an electromechanical valve, wherein power is withheld from the valve to trigger the vale to move away from a fully open position and power is subsequently applied to reinstate the fully open position immediately following detecting that the test valve has moved away from the fully open position. These operations are performed and monitored to determine whether they are completed within a prescribed period of time and associated data is generated that indicates a health of the valve subjected to the PST.

20 Claims, 4 Drawing Sheets

PARTIAL STROKE TESTING

CROSS-REFERENCE TO RELATED APPLICATION(S)

This is a Continuation-In-Part application of U.S. patent application Ser. No. 12/235,377 under 35 U.S.C. 120, entitled "Partial Stroke Testing With Pulsed Control Loop," filed on Sep. 22, 2008, the entirety of which being incorporated by reference.

BACKGROUND

The present disclosure relates to Partial Stroke Testing (PST) of a shut-off valve apparatus and particularly to PST using a control loop to test operation of an Emergency Safety Device (ESD) such as a rapid-closing shut-off valve apparatus.

SUMMARY

According to the present disclosure, a PST methodology and equipment are provided wherein an electromechanical valve assembly to be tested is subjected to change in power to trigger closure of the fully opened valve. Once movement of the valve from a fully opened position is detected, power is again changed to re-trigger the fully open position. The testing includes ensuring that both the movement away from the fully open position and the return to the fully open position are detected within a prescribed period of time.

According to disclosed embodiments, the PST equipment may be at least partially implemented using an on-board solid state logic circuit configured to control testing and report pass/fail testing results. The PST equipment may also or alternatively be partially implemented using an on-board microprocessor configured to control the testing and generate "health report" information for the tested valve.

According to disclosed embodiments, the PST methodology may be initiated locally, e.g., on the valve or on a control panel near valve or remotely, e.g., from a Burner Management System.

Additional features of the disclosure will become apparent to those skilled in the art upon consideration of the following detailed description of illustrated embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION OF EMBODIMENTS

Figure 1:
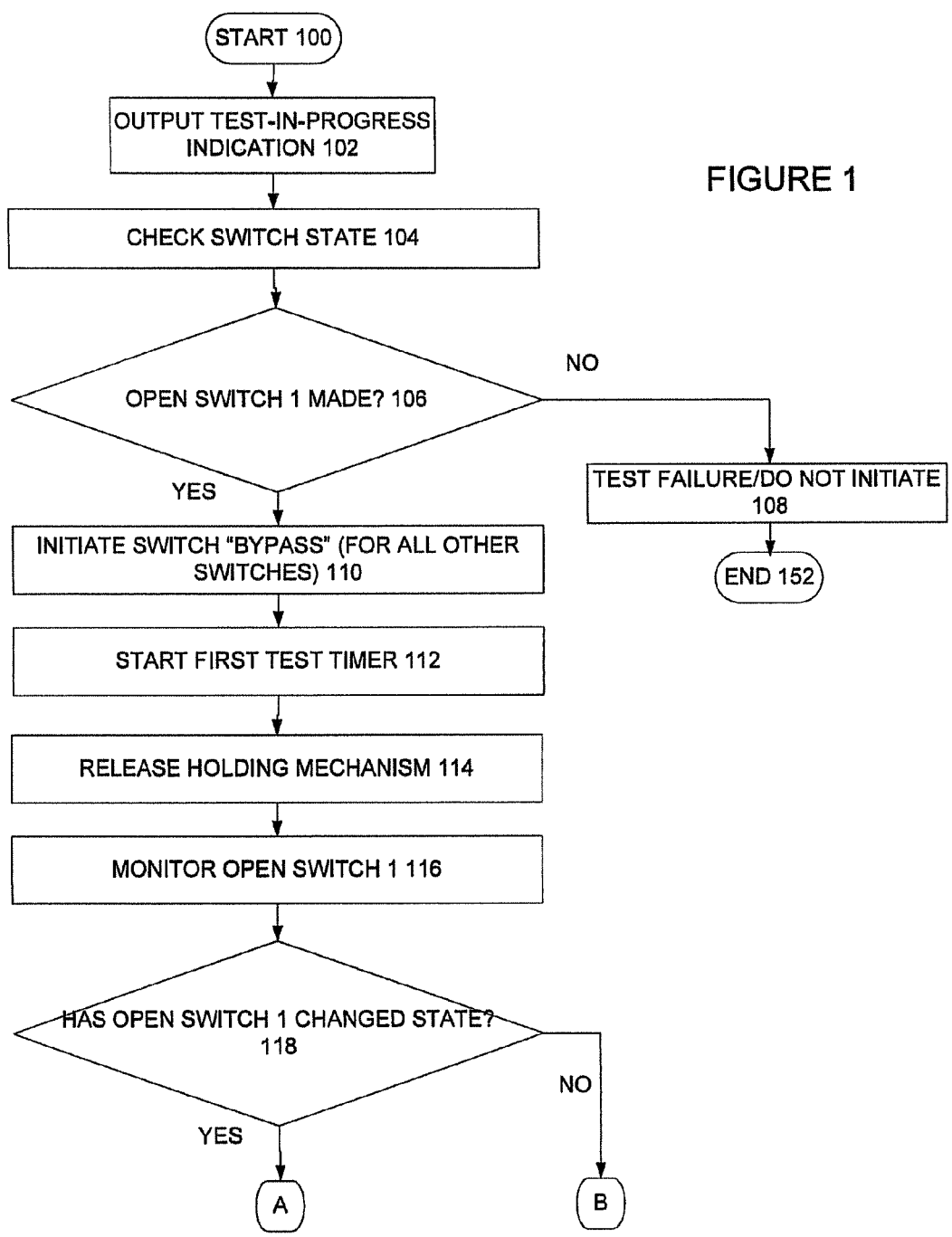
FIGS. 1-3 are flow charts illustrating the overall testing methodology performed in accordance with disclosed embodiments for performing PST analysis of an electromechanical valve.

It should be understood that illustrated embodiments have particular utility in performing diagnostics regarding conventional Safety Shut-Off Valves (SSOVs) that open and close to control material flow in a conduit or piping system.

The opening and closing of some known shut-off valves, such as SSOVs, are controlled by pneumatic signals (i.e., pneumatic valves) and/or electrical signals (i.e., electromechanical valves). Such conventional shut-off valves, such as those included in piping systems though which combustible fuel is delivered, are configured to close very rapidly. Rapid closing in such valves is desirable, for example, when an alarm condition is present or if electrical or pneumatic inputs to the valve are severed or otherwise lost. In such situations, rapid-closing shut-off valves are routinely used to comply with the real-time shutoff requirements necessary for efficiency and safety.

Because such rapid-closing valves are utilized to respond in an immediate fashion, it should be appreciated that the failure of a rapid-closing valve to close when required can be particularly problematic. Accordingly, various conventional techniques and devices are available for testing of such valves so as to reduce the probability of failure for such valves and the equipment including those valves.

Routinely, SSOVs are tested during routine maintenance of the system incorporating the valves, which generally involves shutting down a process performed in the system incorporating the valves. The testing of such valves as part of shut down of a process involves what is referred to as "full stroking" of the valve. Full-stroke testing involves completely closing the valve to ensure that the valve will respond to a control to close when necessary, e.g., in an emergency situation.

However, the ability to test valves while a process is in service has greater utility because manufacturing and industrial processes may continue during the testing process. Thus, there are various conventional Partial Stroke Testing (PST) systems and techniques for testing the ability to partially close a valve while a system or process involving the valve is in service. The theory underlying partial-stroke techniques is both diagnostic and preventative. First, in some failure modes, there is a likelihood that a valve failure may be diagnosed just as effectively using partial-stroke testing as in full-stroke testing because some modes of valve failures result from a valve becoming frozen or stuck in one position. As a result, actuator and/or return spring sizing can be insufficient to actuate the valve under certain conditions, e.g., valve packing is seized or tight, air line to actuator is crimped or blocked, a valve stem sticks or a valve seat is scarred, contains debris or is plugged due to deposition or polymerization. Moreover, routine maintenance using partial-stroke techniques can potentially help prevent some valve failure modes relating to frozen or stuck valves.

However, in some industries, the process may be required to run for extended periods of time between shutdowns. This requirement can result in a need to verify that the SSOVs will perform as expected in the event of a process shutdown. However, during the extended operational periods, dirt and debris may deposit on the internal surfaces of the valve thereby preventing or hindering the valve from functioning as intended. The ability to move the valve a small amount (e.g., approx 10%) of the valve stroke confirms that the valve has not become "stuck," and increases the likelihood that the SSOVs will perform as required when the process does shut down.

Accordingly, a testing methodology has been developed for testing pneumatic valves using various methods of pressure modulation/release (see U.S. patent application Ser. No. 12/235,377, incorporated by reference). Moreover, the presently disclosed embodiments provide an additional methodology for the PST of an electromechanical valve. Optionally, this electromechanical valve PST may be controlled from a remote location/control panel.

Thus, disclosed embodiments provide equipment and methodologies for PST of electromechanical SSOVs that may utilize at least one on-board solid state logic circuit to control testing and report simple pass/fail results or at least one on-board microprocessor to control the testing and generate "health report" information for the tested valve, wherein the test may be initiated locally, e.g., on the valve or on a control panel near valve) or remotely, e.g., from a Burner Management System or BMS.

As explained in U.S. patent application Ser. No. 12/235,377, conventional safety shut off valve assemblies routinely include one or more switches used to determine one or more locations of a valve member included in the valve assembly. Accordingly, a valve assembly may include, for example, an open-limit switch positioned so as to indicate when the valve member is located at the open limit of the valve member's stroke. Likewise, a valve assembly may include, a closed-limit switch positioned so as to indicate when the valve member is located at the closed limit of the valve member's stroke. Although typically, limit switches are used to provide full open or full shut indications, switches may be positioned in intermediate locations along the valve member's stroke path.

It should be understood that, conceptually, there are two main parts of the testing methodology: a first part pertaining to the period of time required for the switch to move away from a fully open state in response to a removal of power maintaining that switch in the fully open state. Subsequent to this first part of the testing methodology, power is reapplied to the switch to determine the period of time required for the switch to return to a fully open state following re-establishment of power to the switch. Thus, once the triggered state change of the valve open switch is detected in the first part of the test and the period of time for that state change is registered, the release mechanism for the test valve is reengaged to stop test valve travel and the second part of the test is performed, in which the test valve is driven back to a fully open position and the period of time for that to occur is measured.

An example of the disclosed PST methodology sequence will now be explained in conjunction with at least one disclosed embodiment described in connection with the figures.

In the disclosed embodiments, unlike the methodology disclosed in U.S. patent application Ser. No. 12/235,377, only the open-limit switch need be utilized. This is because the reaction on electromechanical valves are often much more instantaneous. The overshoot risk due to pneumatic valve actuation is not present in electromechanical valves. Therefore, there is no need to incorporate closed switches.

Figure 2:
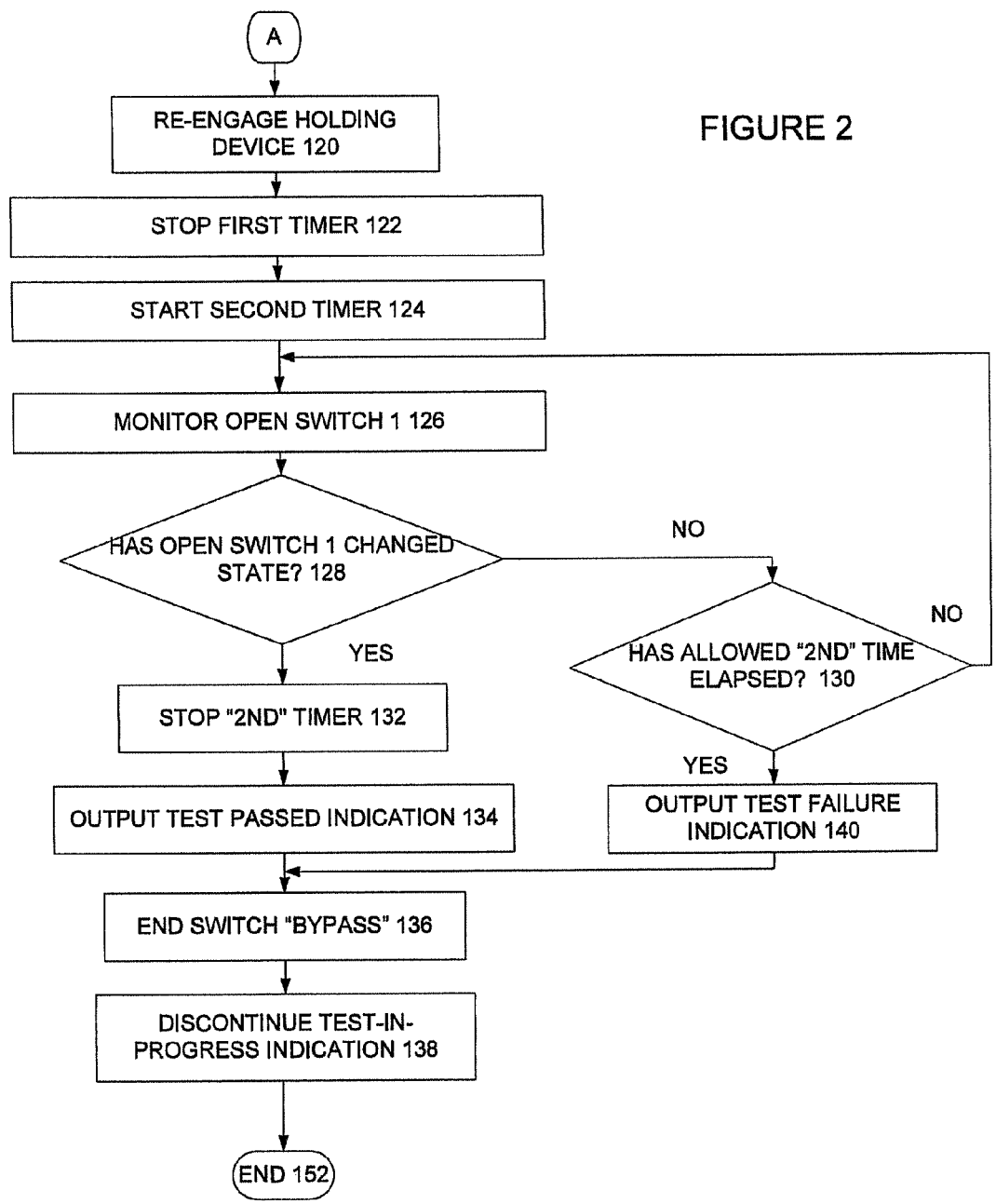
Figure 3:
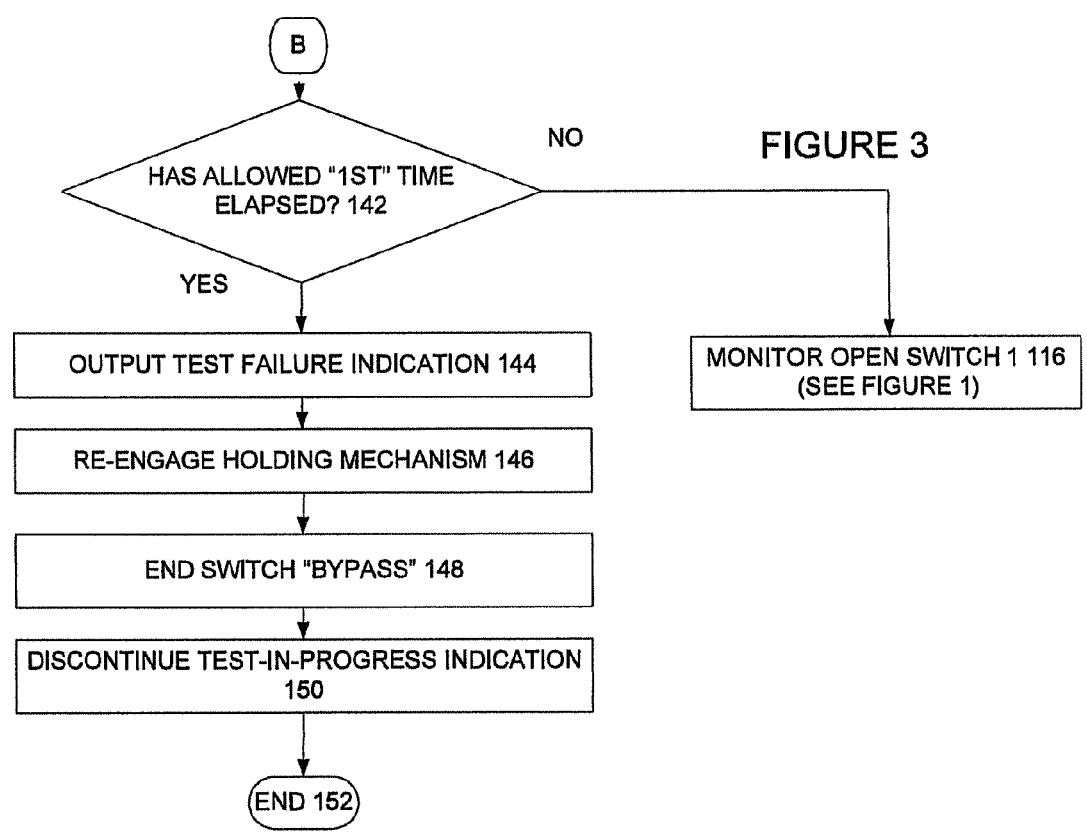

Thus, FIGS. 1-3 provide a flow chart illustrating an overall testing methodology performed in accordance with disclosed embodiments for performing PST analysis of an electromechanical valve.

The methodology begins at 100 and control proceeds to 102, at which a test-in-progress indication is output. For example, as explained herein, this may be the activation of a Light Emitting Diode (LED) provided on the test module provided on the electromechanical valve. Control then proceeds to 104, at which the state of an open switch 1 is checked. If it is determined that the open switch 1 is not made at 106, control proceeds to 108, at which a test failure indication is output and/or data is transmitted to personnel indicating that the partial stroke test failed. Subsequently, control proceeds to 152, at which operations end.

If, however, it is determined that the open switch 1 is made at 106, control proceeds to 110, at which switch "bypass" is initiated for all switches other than the switch (open switch 1) being tested. It should be understood that, in each electromechanical valve, at least one open switch is required; however, multiple switches may be included for each valve including more than one open switch. However, for the PST test to be performed effectively without triggering unwanted operation or malfunction of the valve or an associated Burner Management System, switch bypass must be performed for all switches other than the open switch being monitored.

Control then proceeds to 112, at which a first test timer (associated with monitoring a first testing time period for open switch 1 state change) is started and control proceeds to 114, at which the holding mechanism is released to begin to close the valve. This first testing time period corresponds with the time period required between the removal of power to the holding mechanism and the resulting change of state for open switch 1; this may be considered to be a first part of the PST test.

In essence, the release of the electromechanical valve's holding mechanism may be considered to be simultaneously triggered with the starting of the first test timer. Thus, the test timer is started at the same time that the holding mechanism is "released." As explained above, the holding mechanism may be released by, e.g., discontinuing power to the electromechanical valve, which should, theoretically, trigger the valve to close (provided that the valve is operating correctly).

Control then proceeds to 116 at which open switch 1 is monitored to determine whether a change of state has occurred, i.e., the valve open switch has changed state.

If it is determined at 118 that the open switch 1 has changed state, control proceeds to 120 (as illustrated in FIG. 2). At 120, the holding device is re-engaged and control proceeds to 122, at which the first timer is stopped.

Control then proceeds to 124 at which the second timer is started. Control then proceeds to 126, at which monitoring of open switch 1 is performed. If, at 128, it is determined that the open switch 1 has not changed state, it is determined whether the allowed second time has elapsed at 130. If not, control returns to 126 to continue monitoring the open switch 1. In this way, monitoring of the open switch 1 is continued until a maximum time period associated with the second part of the test is expired. The second part of the PST test pertains to the time period required for the switch to re-establish a fully open state once power is reapplied to the switch.

If it is determined at 130 that the second time period has elapsed, control proceeds to 140, at which a test failure indication is output from the test module (e.g., activation of an LED associated with a test failure, etc.). This test failure is based on the determination that re-engagement of the motor failed to drive the test valve back to a fully open position, which is contrary to correct operation of the valve. Subsequently, control proceeds to 136, at which the switch bypass operations initiated at 110 are discontinued. The test-in-progress indication is also discontinued at 138 because the test has failed. Control then proceeds to 152, at which the testing operations are ended.

If it is determined at 128 that the open switch 1 has changed state, control proceeds to 132 at which the second timer is stopped. Control then proceeds to 134, at which a test pass indication is output as explained below. Control then proceeds to 136, as above, at which the switch bypass operations initiated at 110 are discontinued; thereafter, the test-in-progress indication is discontinued at 138 and operations end at 152.

Returning to FIG. 1, if it is determined in the first part of the test that the open switch 1 has not changed state at 118, control proceeds to 142, as illustrated in FIG. 3. It is then determined whether the first time period (associated with the first part of the test) has elapsed at 142. As explained above, if not, control returns to 116 (see FIG. 1) to continue monitoring the open switch 1. In this way, monitoring of the open switch 1 is continued until a maximum time period associated with the first part of the test is expired. As discussed above, the first part of the PST test pertains to the time period required for the switch to move away from a fully open state once power has been discontinued from the holding mechanism.

If it is determined at 142 that the first time period has elapsed, control proceeds to 144, at which a test failure indication is output from the test module (e.g., activation of an LED associated with a test failure, etc.). This test failure is based on the determination that disconnection of the holding mechanism failed to drive the test valve away from a fully open position, which is contrary to correct operation of the valve. Subsequently, control proceeds to 146, at which the holding mechanism is re-engaged at 146. Subsequently, the switch bypass operations initiated at 110 are discontinued at 148. The test-in-progress indication is also discontinued at 150 because the test has failed. Control then proceeds to 152, at which the testing operations are ended.

Although not shown, it should be appreciated that at least one disclosed embodiment may also record and store the time required to complete the test because that type of data may be indicative of the health of the test valve. Thus, for example, a progressively increasing period of time required to complete the test, may be indicative of a deteriorating valve or one that requires maintenance.

It should be appreciated that the period of time allotted with the valve test may be based on a number of criteria including the type of valve, the application of the valve, the type of media being controlled, the configuration of the valve, etc.

Once the testing operations performed in FIGS. 1-3 are complete, the test valve is returned to its normal control state.

While the testing methodology is in process, relays (not shown) may be used to prevent a BMS controlling the test valve from detecting a change of state in the valve. This is because, depending on the design of that BMS, a change of state detected in the SSOV could trigger process shutdown causing disruption to the customer's process.

Likewise, as explained herein a test module associated with a valve may include a bypass module configured to implement valve switch bypass for the valve while it is being tested and discontinuing valve switch bypass following completion of a test. This may help ensure that no extraneous or irrelevant input/output or control instructions are registered from the valve during valve testing.

Once a failed test is registered, a soft or hard alarm may be issued to notify appropriate personnel. Further, it may be the responsibility of those personnel to determine the safest way to shut down the process and repair/replace the test valve.

In the event of a failed test due to a failure of the valve to return to the original state by the end of the test, but where the test valve has moved off of the valve fully open switch, it should be appreciated that an associated BMS may itself register the change of state of the valve open switch for the test valve. In such a situation, the resulting analysis and procedures may depend on the design of the BMS; however, it is possible that further operation of the valve may be permitted. Alternatively, in the event of a failed test due to a failure to complete the test in the allowed time period but where the valve did return to its original state before the end of test, it is possible that no further operation of the valve may be permitted.

Figure 4:
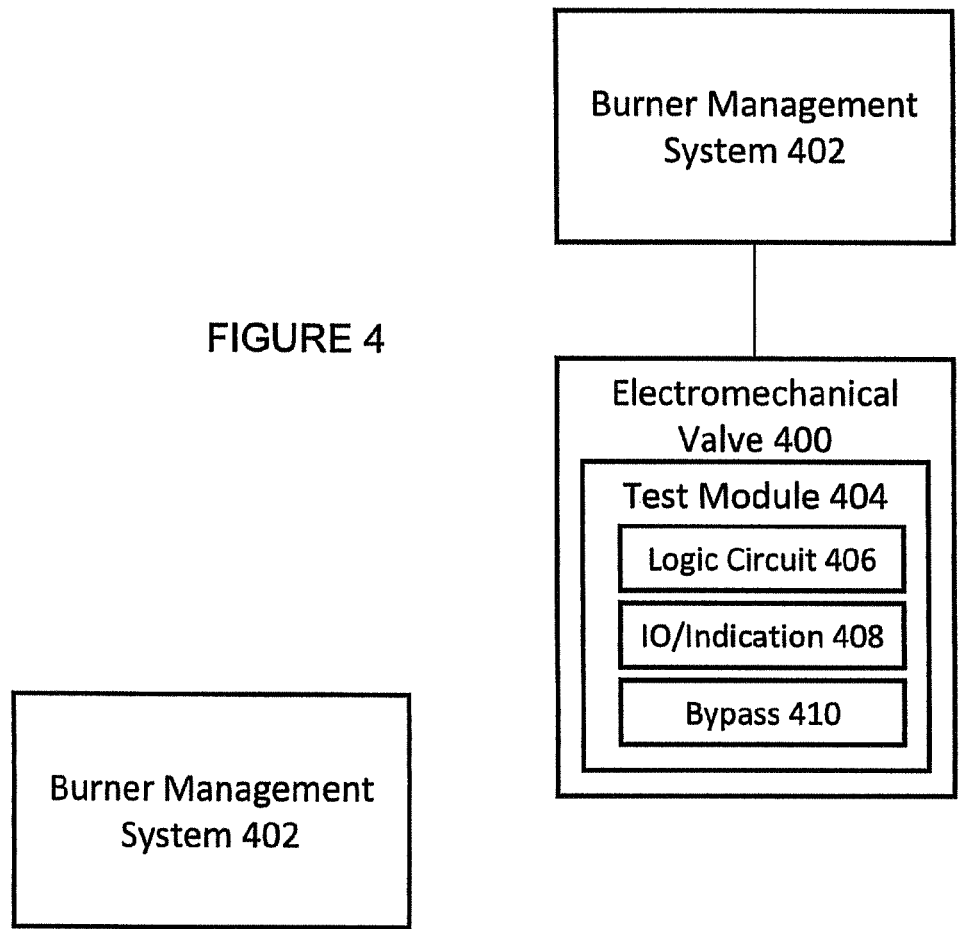
FIG. 4 provides a conceptual block diagram illustrating an IC board implementation utilized by at least one illustrated embodiment.
Figure 5:
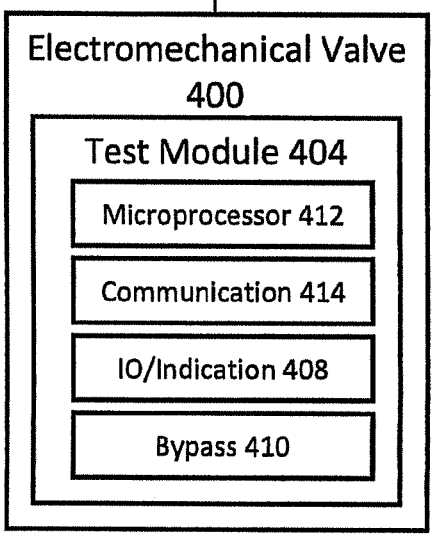
FIG. 5 provides a conceptual block diagram illustrating a microprocessor implementation utilized by at least one illustrated embodiment.

In accordance with at least one embodiment, it is possible that all hardware/software required for the performing the PST methodology may be provided on or in the test valve or test valve assembly, with the only exception being a test initialization actuator and necessary mechanisms for registering test results as explained in conjunction with FIGS. 4 and 5. Such components may be located either on the valve, valve assembly or located in a remote location for ease of use.

Thus, in accordance with at least one embodiment, an onboard test module may be implemented utilizing an onboard solid state logic circuit of various different configurations, complexities and functions.

Thus, as shown in FIG. 4, the test module 404 may be coupled to the electromechanical valve 400 that is operationally coupled to an associated BMS system 402. That test module 404 may include a Logic Circuit 406 may be coupled to and in communication with an Input/Output (IO)/Indication sub-module 408 that may include a plurality of indicator lights (e.g., Light Emitting Diodes) associated with a test-in-progress, a failed test or a passed test. The operations performed for the testing methodology may be programmed into the Logic Circuit 406 that may be implemented as an Application Specific Integrated Circuit (ASIC or the like). In such an implementation, the Logic Circuit 406 may be configured to control the test and report simple pass/fail results.

Also included in the test module 404 is a bypass module 410, which is configured to implement valve switch bypass for the valve 400 while it is being tested by test module 404 and discontinuing valve switch bypass following completion of a test on the valve 400. As explained below, valve switch bypass is performed to ensure that no extraneous or irrelevant input/output or control instructions are registered from the valve during valve testing.

If the disclosed embodiments provide a test module implemented using solid state logic, the corresponding test methodology can report the test status via associated indicator lights that are also wired to the valve (or located on the valve) indicating simple status only. Various different test results may be reported including Test in Process, Test Pass, and Test Fail indications. If desired, the test fail result may, in turn, trigger a "soft alarm" signal. In accordance with at least one disclosed embodiment, such a soft alarm signal could be utilized in the BMS for a variety of functions including preventing the restart of a valve-involved process (i.e., a process that utilizes the valve or equipment coupled to the valve) until the signal is cleared by authorized personnel.

Alternatively, in accordance with another implementation illustrated in FIG. 5, the on-board solid state logic circuit may be an on-board microprocessor 412 that may be used to control the testing methodology. Such a microprocessor 412 configuration may also include memory and be used to log and report actual result values; logged values may also be used to track valve performance over time (e.g., used as a mechanism to track and/or predict valve "health"). Thus, such "health" data can be used to trigger one or more alarms (e.g., either soft or hard alarms) to signal facility personnel that the test valve is in need of maintenance/cleaning/replacement or predict that the test valve soon may be in such need.

If the disclosed embodiments provide a test module implemented using a microprocessor, as in FIG. 5, the corresponding test methodology can report test status via the same or similar indicator lights included in the IO/Indication sub-module 408 as well as log (e.g., electronically store) test data resulting from the testing methodology. Test data logged may include, for example, time-test start to switch break, switch break to switch make, test start to switch make (total time), number of tests complete, time since last test, etc. This data could be retrieved via a communication port included in the communication sub-module 414 included on the test module 404 and may be analyzed to determine and document valve maintenance needs, track performance, track deterioration and establish a record of safety compliance activity. Optionally, data may be displayed on a Liquid Crystal Display (LCD) (not shown).

Additional automation may be built into the microprocessor implemented test module to enable initiation of automated or semi-automated testing at predetermined intervals. This could further enhance safety by ensuring that safety tests are not forgotten or skipped.

Regardless of the testing methodology used (e.g., pass/fail test or valve health diagnostics), equipment for performing the disclosed testing methodology may be configured to enable the basic valve function, i.e., safety shut-off, to remain unaffected during a PST test. Thus, the valve may still be permitted to close at any point during the test if an underlying process is required to shut down.

It should be appreciated that, although not shown, the disclosed PST methodology may be initiated by pressing an actuator, e.g., button on the valve, in an auxiliary control panel near the valve, or at the main system control (e.g., the BMS). The actuator (regardless of its location) may be connected or coupled to a specific test valve and initiate the PST test sequence when actuated.

It should be understood that, although the embodiments are being explained with reference to a normally open energized valve assembly; for example, the valve assembly is receiving power during normal process operation and, in the event of an emergency, the valve assembly is de-energized, thereby triggering the movable valve member of the valve assembly to either close or open depending on the configuration. However, it should be understood that the PST testing may be performed just as easily for a configuration wherein emergency shut off triggers power to the valve to open the valve assembly.

Further, although the illustrated embodiments have been described in connection with electromechanical valves, it should be understood that there may be utility in utilizing the disclosed embodiments or adapting them for use with hydraulic valves.

Thus, regardless of the exact details provided with reference to certain illustrated embodiments, variations and modifications exist within the scope and spirit of the invention as described and defined in the following claims. Accordingly, while illustrated embodiments have been outlined above, it is evident that many alternatives, modifications and variations will be apparent to those skilled in the art. For example, although the illustrated embodiments are discussed in conjunction with control of valves in a combustion service environment (involving a BMS control system), it should be understood that the embodiments may be utilized with valves that control, gases, liquids and also solids, for example, pulverized coal. Accordingly, the various embodiments of the invention, as set forth above, are intended to be illustrative, not limiting. Various changes may be made without departing from the spirit and scope of the invention.

As a result, it will be apparent for those skilled in the art that the illustrative embodiments described are only examples and that various modifications can be made within the scope of the invention as defined in the appended claims.

The invention claimed is:

1. A Partial Stroke Testing (PST) equipment configuration comprising:
    means for altering application of power applied to an electromechanical valve to trigger movement away from a fully open state;
    means for detecting the movement away from the fully open state of the electromechanical valve;
    means for altering application of the power to the electromechanical valve to re-establish the fully open state following detection of the movement away from the fully open state, wherein the means for detecting the movement away from the fully open state also detects the re-establishment of the fully open state of the electromechanical valve;
    means for detecting a first period of time occurring between a first alteration of power and a triggered movement away from the fully open state and detecting a second period of time occurring between a second alteration of power and re-establishment of the fully open state of the electromechanical valve; and
    means for registering passing or failure of PST based on the detected movement of the electromechanical valve and the detected first and second periods of time.

2. The PST equipment configuration of claim 1, wherein the means for detecting the movement away from the fully open state of the electromechanical valve includes a switch being configured to register a fully open position of the electromechanical valve.

3. The PST equipment configuration of claim 1, further comprising means for registering valve health data generated by the means for detecting movement, means for detecting a period of time and means for registering passing or failure.

4. The PST equipment configuration of claim 1, wherein the means for registering determines a failure of the electromechanical valve in response to a determination that the electromechanical valve failed to move away from the fully open state in response to the first alteration of the application of power.

5. The PST equipment configuration of claim 1, wherein the means for registering determines a failure of the electromechanical valve in response to a determination that the electromechanical valve failed to re-establish a fully open state in response to the second alteration of the application of power.

6. The PST equipment configuration of claim 1, wherein the first alteration of the application of power used to trigger movement away from the fully open position is a discontinuation of applied power.

7. The PST equipment configuration of claim 1, wherein the second alteration of the application of power used to trigger re-establishment of the fully open position is an application of previously unapplied power.

8. The PST equipment configuration of claim 1, further comprising means for storing PST data including the registered passing or failure of PST and the period of time detected for completing the PST.

9. The PST equipment configuration of claim 8, further comprising means for outputting the stored PST data.

10. The PST equipment configuration of claim 1, further comprising means for generating an alarm based on a registered failure of the electromechanical valve.

11. A Partial Stroke Testing (PST) methodology comprising:
    initially altering application of power applied to an electromechanical valve to trigger movement away from a fully open state;
    detecting the movement away from the fully open state of the electromechanical valve;
    further altering application of the power to the electromechanical valve to re-establish the fully open state following detection of the movement away from the fully open state;
    detecting the re-establishment of the fully open state of the electromechanical valve;

determining a first period of time occurring between the initial alteration of power and a triggered movement away from the fully open state;

determining a second period of time occurring between the further alteration of power and the re-establishment of the fully open state of the electromechanical valve; and registering passing or failure of PST based on the detected movement of the electromechanical valve and the first and second periods of time.

12. The PST methodology of claim 11, wherein detecting the movement away from the fully open state of the electromechanical valve utilizes a switch configured to register a fully open position of the electromechanical valve.

13. The PST methodology of claim 11, further comprising registering valve health data generated by the detecting of movement of the valve, detection of the period of time and registered passing or failure.

14. The PST methodology of claim 11, further comprising determining a failure of the electromechanical valve in response to a determination that the electromechanical valve failed to move away from the fully open state in response to the initial alteration of the application of power.

15. The PST methodology of claim 11, further comprising determining a failure of the electromechanical valve in response to a determination that the electromechanical valve failed to re-establish a fully open state in response to the further alteration of the application of power.

16. The PST methodology of claim 11, wherein the initial alteration of the application of power used to trigger movement away from the fully open position is a discontinuation of applied power.

17. The PST methodology of claim 11, wherein the further alteration of the application of power used to trigger re-establishment of the fully open position is an application of previously unapplied power.

18. The PST methodology of claim 11, further comprising storing PST data including the registered passing or failure of PST and the period of time detected for completing the PST.

19. The PST methodology of claim 18, further comprising outputting the stored PST data.

20. The PST methodology of claim 18, further comprising generating an alarm based on a registered failure of the electromechanical valve.

* * * * *